United States Patent [19]
Chattha et al.

[11] Patent Number: 5,950,421
[45] Date of Patent: Sep. 14, 1999

[54] TUNGSTEN-MODIFIED PLATINUM NOX TRAPS FOR AUTOMOTIVE EMISSION REDUCTION

[75] Inventors: Mohinder S. Chattha, Northville; Robert J. Kudla, Warren; Clifford Norman Montreuil, Farmington, all of Mich.

[73] Assignee: Ford Global Technologies, Inc., Dearborn, Mich.

[21] Appl. No.: 08/993,927

[22] Filed: Dec. 18, 1997

[51] Int. Cl.⁶ ........................................................ F01N 3/00
[52] U.S. Cl. ............................ 60/274; 60/301; 423/213.5; 423/239.1
[58] Field of Search ................................ 60/274, 295, 297, 60/301; 423/213.5, 239.1

[56] References Cited

U.S. PATENT DOCUMENTS

| | | | |
|---|---|---|---|
| 3,966,391 | 6/1976 | Hindin et al. | 431/7 |
| 5,399,324 | 3/1995 | Subramanian et al. | 423/213.7 |
| 5,473,887 | 12/1995 | Takeshima et al. | |
| 5,714,130 | 2/1998 | Saito et al. | 423/239.1 |
| 5,727,385 | 3/1998 | Hepburn | 60/297 |

*Primary Examiner*—Edward K. Look
*Assistant Examiner*—Binh Tran
*Attorney, Agent, or Firm*—Lorraine S. Melotik

[57] ABSTRACT

The invention is a method of treating exhaust gases generated by an internal combustion engine using a NOx trap in the exhaust gas system. The method comprises locating an essentially alkaline earth-free nitrogen oxide trap in the exhaust gas passage and cycling the air/fuel ratio of the exhaust gases entering the trap between lean and rich, such that the trap absorbs nitrogen oxides during the lean cycle and desorbs the nitrogen oxides when the concentration of the oxygen in the exhaust gas is lowered as during a rich cycle. The trap comprises: (a) a porous support material comprising mostly γ-alumina and (b) metals consisting essentially of 0.1 to 2 wt. % tungsten oxide and precious metal comprising 0.5 to 4 wt. % platinum deposited on the support, the amount of said metals being individually based on the weight of said support material. The desorbed nitrogen oxides may be converted over the precious metal to $N_2$ and $O_2$ by reductants like hydrocarbons present in the exhaust gas.

12 Claims, 1 Drawing Sheet

TUNGSTEN-MODIFIED PLATINUM NOX TRAPS FOR AUTOMOTIVE EMISSION REDUCTION

Reference is made to concurrently filed U.S. patent application Ser. No. 08/992,943 entitled "Use of Platinum/Alumina as NOx Trap Materials for Automotive Emission Reduction". Reference is also made to related Ser. No. 08/662,178 filed Jun. 12, 1996 and entitled "Bimetallic Tungsten/Platinum Catalysts For Lean-Burn Reduction".

FIELD OF THE INVENTION

This invention relates to a method of using a nitrogen oxide trap comprising platinum and tungsten oxide in the exhaust gas passage system of a gasoline internal combustion engine to absorb nitrogen oxides during lean-burn operation and release the nitrogen oxides when the oxygen concentration in the exhaust gas is lowered.

BACKGROUND OF THE INVENTION

Catalysts are employed in the exhaust systems of automotive vehicles to convert carbon monoxide, hydrocarbons, and nitrogen oxides (NOx) produced during engine operation into more desirable gases. When the engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

It is desirable, however, to operate gasoline engines under "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of NOx during lean-burn (excess oxygen) operation. Efforts have been made in developing lean-burn catalysts in recent years. One deficiency of some of the conventional lean-burn catalysts is that they are based on zeolite materials which are less than durable at the elevated temperatures necessary for their efficient catalytic operation in the exhaust gas system. Lean-burn catalysts act to reduce the NOx through the use of hydrocarbons and carbon monoxide over a catalyst, the hydrocarbons and carbon monoxide hence being in turn oxidized.

Recent efforts to solve the problem of NOx in lean-burn systems have focused on lean-NOx traps, i.e., materials which are able to absorb nitrogen oxides during lean-burn operation and is able to release them when the oxygen concentration in the exhaust gas is lowered. Hence, these traps are used with engine systems which operate primarily in a lean air/fuel ratio, but then when it is desired to purge the traps of NOx, the exhaust entering the trap is made richer, particularly rich of stoichiometric. Typical of catalyst materials used in conventional traps are an alkaline earth metal like barium combined with a precious metal catalyst like platinum. European Patent Application 0613714A2 published Sep. 7th, 1994 discloses that platinum or palladium in various combinations with at least two ingredient materials of the alkali metals, alkaline earth metals, transition metals, or rare-earth metal are capable of storing or absorbing nitrogen oxides under exhaust conditions of excess oxygen and desorbing the NOx during stoichiometric or fuel-rich atmospheres. When the NOx is purged, it is expected that the NOx is oxidized over the precious metal to nitrogen and oxygen.

The widely held mechanism for this absorption phenomena is that during the lean-burn operation the platinum first oxidizes NO to $NO_2$ and the $NO_2$ subsequently forms a nitrate complex with the other material, e.g., the barium. In the regeneration mode as during a stoichiometric or rich environment, the nitrate is thermodynamically unstable, and the stored NOx is released. NOx then catalytically reacts over the platinum with reducing species in the exhaust gas like HC and CO to form $O_2$ and $N_2$. Hence according to one strategy for using lean-NOx traps, a hybrid-mode engine strategy is used to cycle the air/fuel ratio between extended periods of lean operations where the traps sorb NOx emissions, alternated with brief, fuel-rich intervals to desorb the adsorbed NOx and regenerate the lean-NOx trap. U.S. Pat. No. 5,473,887 discloses such operation of an exhaust purification device, the teachings of which are hereby expressly incorporated by reference herein.

The alkali metal and alkaline earth metals which are typically utilized for NOx sorption have, however, the serious drawback that they are readily poisoned by sulfur in the exhaust gas. Most fuels for automotive vehicles contain sulfur and when burnt, the sulfur is converted to sulfur compounds like $SO_2$. Over time, the sulfur compounds react with these alkali metal or alkaline earth trap materials forming sulfates which will not revert back to the sorption material. These sulfates are inactive for NOx sorption. The alkali metals are particularly problematic. As a result, the typical NOx trap material which uses precious metal and an alkaline earth like barium is strongly deactivated by sulfur in the fuel.

In concurrently filed patent application mentioned above, we found that a platinum/alumina catalyst, without inclusion along with the platinum of basic oxides like BaO or SrO reported to be an essential part of the catalyst, performs equally well under lean-rich cyclic conditions so that they can be advantageously used as NOx trap catalysts. Even though the Pt-BaO/alumina catalyst, when fresh, has a slight advantage over Pt/alumina, BaO-Pt/alumina is more sensitive to sulfur poisoning and has been found to lose this advantage upon aging. Since alumina is not a conventional basic oxide, the observation that a platinum/alumina catalyst free of an alkaline earth like barium oxide could be used as a NOx trap catalyst was totally unexpected to the inventors. At this point the inventors do not understand the mechanism of nitrogen oxide absorption by the Pt/alumina catalysts, however, it does not seem to be based on the basicity of the washcoat alone.

According to the present invention, we have now found that the incorporation of tungsten oxide into the Pt/alumina alkaline earth-free catalyst composition enhances its nitrogen oxide reduction at low temperatures under nitrogen oxide trap situations of cyclic lean-rich exhaust conditions as shown in FIG. 1. Since tungsten oxide increases the acidity of the catalyst, it would have decreased the basicity and thus would be expected to lower the nitrogen oxide conversion, if the nitrogen oxide absorption-desorption mechanism reported in the literature for NOx trap materials were completely correct. The inventors believe that the improved nitrogen oxide conversion found according to the present invention is contrary to the prevailing thought and therefore they found it quite unexpected. The formulation of tungsten and platinum on alumina was found by the inventors to be useful as a lean-burn catalyst as disclosed in related U.S. patent application Ser. No. 08/662,178 filed Jun. 12, 1997 mentioned above. Lean-burn catalysts are formulated to be used to continuously convert exhaust gas components during operation of the engine. They are not expected to store the components of the exhaust gas, like nitrogen oxides, during operation. Other well known lean-burn catalysts include zeolite materials. Such materials are not found useful as nitrogen oxide trap materials. Hence, it was unexpected that a tungsten oxide/platinum on alumina catalyst material would be suitable as a nitrogen oxide trap material.

DISCLOSURE OF THE INVENTION

This invention is directed to a method treating exhaust gas emissions which comprises locating a NOx trap material in an exhaust gas passage of an internal combustion engine, exposing the trap material to engine exhaust gases having a lean of stoichiometric air/fuel ratio whereby the trap material absorbs nitrogen oxides from the exhaust gas; monitoring the amount of absorbed nitrogen oxides in the trap; and purging the absorbed nitrogen oxides by subjecting the nitrogen oxide trap to engine exhaust gases whose air/fuel ratio is stoichiometric or rich of stoichiometry. The NOx trap material comprises: (a) porous support material comprising mostly γ-alumina; and (b) metals consisting essentially of 0.1 to 2 wt. % tungsten oxide and precious metal comprising 0.5 to 4 wt. % platinum deposited on the support, the amount of the metals being individually based on the weight of the support material. The trap may include other precious metal like rhodium or palladium. Preferably the support material is gamma-alumina, and the tungsten oxide and platinum are loaded on the support sequentially, with the tungsten oxide being provided first.

Hence, the NOx trap absorbs NOx when the air/fuel ratio of exhaust gas flowing into the trap device is lean (of stoichiometric) and releases the absorbed NOx when the oxygen concentration in the exhaust gas is lowered, as during rich or stoichiometric operation of the engine. When the NOx is desorbed, it is converted to nitrogen and oxygen over the platinum.

Advantageously, we have found that by using the combination of the precious metal and tungsten oxide, and avoiding alkaline earth metal deposited therewith, the NOx conversion efficiency of the materials is maintained even in the presence of sulfur in the exhaust gas. We have found this to be based on the resistance of the invention trap materials to forming sulfates, in contrast to conventional absorbents like barium which are readily poisoned by sulfur. This allows for an improved trap material as compared to the prior conventional traps.

DESCRIPTION OF PREFERRED EMBODIMENTS

Figure 1:
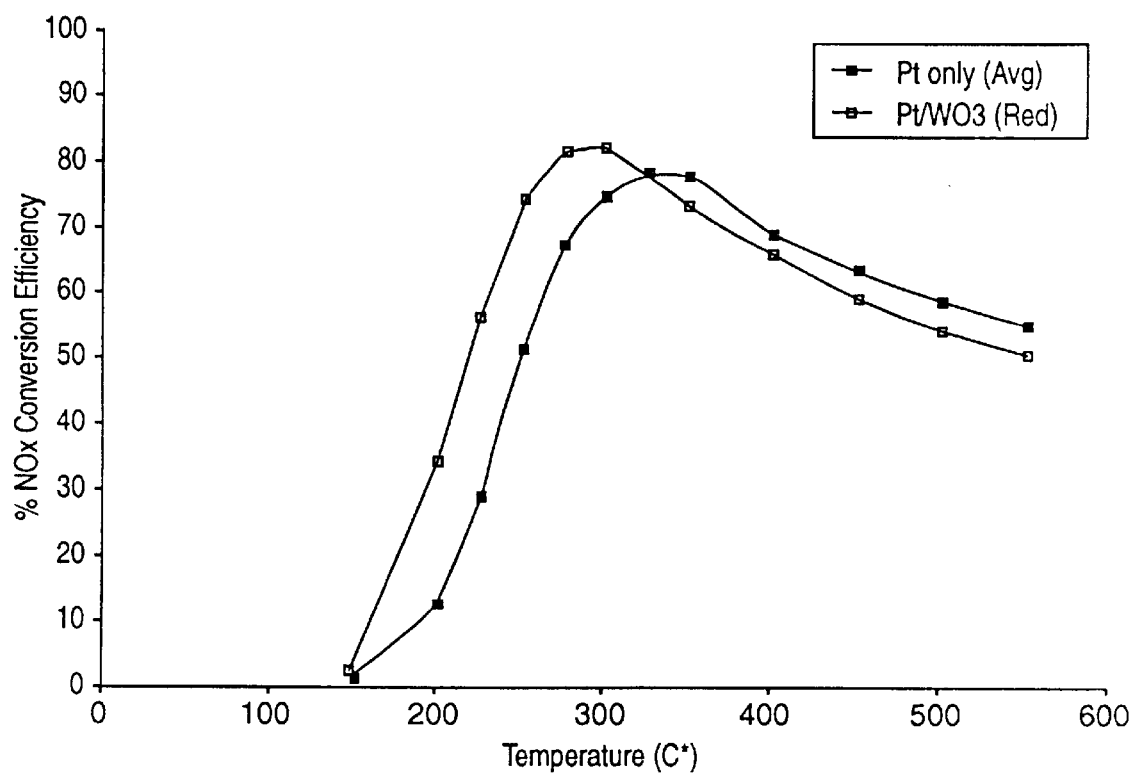
FIG. 1 is a graph showing the nitrogen oxide conversion efficiency of two lean-NOx traps, one being a tungsten-platinum/alumina example according to an embodiment of the present invention (open squares) and the other being a comparative example using only platinum/alumina (solid squares).

The invention method comprises locating a tungsten oxide-platinum on alumina material in the exhaust gas passage of an internal combustion engine and subjecting the material to cyclic air/fuel ratios from lean to rich as disclosed above. In particular, the nitrogen oxide trap is contacted with engine exhaust gases having a lean air/fuel ratio whereby the trap absorbs nitrogen oxides from the exhaust gas. The amount of nitrogen oxides absorbed in the trap is monitored. This can be done by monitoring the concentration of the nitrogen oxides in the exhaust gas entering and leaving the trap and watching for an increase in the concentration (nitrogen oxide breakthrough), or using estimating means such as torque/load measurements of the engine. Still other ways to determine the amount of nitrogen oxide absorbed in the trap, and consequently the available absorbent ability of the trap material, will be apparent to those skilled in the art. When the trap has reached a predetermined fullness of absorbed nitrogen oxide, it is subjected to a nitrogen oxide purge by passing exhaust gases whose air/fuel ratio is stoichiometric or preferably rich of stoichiometric. This may be accomplished by switching the engine to rich air/fuel operating mode or providing an increased concentration of, e.g., hydrocarbons into the gases entering the trap, such as by providing supplemental fuel or other hydrocarbons. Still other ways to increase the air/fuel ratio of the exhaust gas in the trap for purging will be apparent to those skilled in the art in view of the present disclosure. After the trap has been purged of nitrogen oxide, either partially or fully, the trap is again subjected to lean engine operation whereby the trap will absorb the nitrogen oxides from the exhaust gas. And so the absorb/purge cycling will be repeated.

The nitrogen oxide trap material comprises tungsten oxide and precious metal comprising at least platinum loaded on a mostly γ-alumina support material (herein termed "γ-alumina support material"). As disclosed above, alkali metals or alkaline earth metals commonly employed loaded along with the platinum in prior art nitrogen oxide trap materials are not loaded with the precious metal in the present invention.

By "mostly γ-alumina" is meant that the support material comprises more than about 50% by weight of this alumina. More preferably this alumina is greater than 80%, and most preferably substantially all of the support material is γ-alumina. In addition to the γ-alumina, however, if desired the γ-alumina support material may include very small amounts of other materials often included to stabilize the alumina or provide oxygen storage properties like cerium oxide, barium oxide, zirconium oxide, lanthanum oxide, titanium oxide, silica, and alpha-alumina. This support material comprising mostly γ-alumina is desired because it has high surface area, good adhesion and low tungsten/support chemical interaction.

The two required metals: that is the base metal tungsten and the precious metal comprising at least platinum, may be loaded onto the γ-alumina support material in any manner, several methods for providing metals on support materials being well known in the art. One particularly convenient method is by impregnating the γ-alumina support material with an aqueous or organic solvent solution comprising a soluble compound of the metal. Exemplary of such solvents are water, solution of alkalis like sodium hydroxide, ethanol, toluene, isopropyl alcohol, acetone, methylethylketone, butylacetate, and dimethylformamide. Exemplary of such soluble tungsten compounds are tungstates like ammonium metatungstate, metatungstic acid, tungstyl acetylacetonate, and tungsten hexahalides. Particularly preferred is ammonium metatungstate. In the same way, soluble platinum containing compounds may be employed to provide platinum on the support. For example, compounds like chloroplatinic acid, amino-Pt-nitrates like tetramine platinum nitrate and Pt-carboxylates are useful. Solvents which may be useful include water and methanol water being preferred. Other such materials which may be used would be apparent to those skilled in the art in view of the present disclosure. Any soluble tungsten and platinum compound which is soluble in an aqueous or organic medium and whose functional group is capable of being decomposed by heat to leave only tungsten or its oxide and the precious metal or its oxide on the support material may be employed in this impregnation technique. Hence, such a compound is called a catalyst precursor compound. Other tungsten and platinum precursor compounds useful in this invention in addition to those listed above will be apparent to those skilled in the art in view of the present disclosure. In addition to the precious metal platinum, other precious metals like palladium and more preferably rhodium may also be deposited with the platinum on the porous support from precursor compounds therefor. Rhodium is particularly useful since it enhances the conversion of nitrogen oxide to nitrogen and oxygen during purging of the NOx trap materials.

According to the method of impregnation disclosed above, the "catalyst precursor compound" (exemplary of the tungsten and precious metal compounds) is dissolved generally by simply mixing the compound into an aqueous or organic solvent to make a catalyst precursor solution thereof. A solution of the catalyst compound is generally further diluted for impregnation of the support. The catalyst precursor solution may also comprise a mixture of compatible organic solvents and/or catalyst compounds.

For useful application in an exhaust system, the washcoat will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the support material may be applied to the substrate and then impregnated with the precursor catalyst solution. Alternately, the impregnated washcoat may be applied to the substrate. Generally, the washcoat (support material) is provided first on the substrate. Still other ways of providing the catalyst product will be apparent to those skilled in the art in view of the present disclosure, the method not being critical to the present invention. Preferably, a tungsten-impregnated washcoat is made into a slurry and the monolith is coated with it. After drying, platinum is then deposited on the washcoat. Generally, for use in an exhaust system this impregnated washcoat is subjected to elevated temperatures to decompose and eliminate the functional group of the catalyst precursor. It may be further subjected to calcining. Optimally, the substrate carries a washcoat (alumina support impregnated with platinum/tungsten oxide) in an amount of between about 25% and 35% by weight based on the weight of the substrate (e.g., monolith).

If the heating is carried out in the air, the tungsten compound decomposes and forms tungsten oxide. If, on the other hand, the heating is carried out in a reducing atmosphere, the tungsten compound may be reduced to elemental tungsten. When the catalyst is placed in use, oxygen present in the exhaust gas will oxidize the tungsten to tungsten oxide. In the case of platinum, it is oxidized to platinum oxide which at high temperatures decomposes to platinum and oxygen. Thus it often exists as a mixture of platinum and its oxides.

The support material is loaded such that the amount of tungsten oxide is between 0.1 and 2% and the amount of platinum is between 0.5–4% by weight, each based on the weight of the support. Preferably the tungsten oxide comprises about 0.1–0.5 wt % and the platinum comprises about 1.5–2.5, mostly preferably about 2% wt. Other precious metals may be included with the platinum, preferably being rhodium, as disclosed above.

For testing of the present invention, a granular support is mixed with a catalyst precursor solution and stirred at an elevated temperature generally of about 75–120° C. to evaporate the solvent. The impregnated support material is then heated to decompose and eliminate the functional group from the mixture, such as by heating at 320° C. for one hour and thereafter for four hours at 600° C. The tungsten and platinum may be impregnated into the washcoat support from a single solution or in sequence, either being impregnated first. It may also involve multiple impregnations.

As discussed above it is well known in the art that conventional NOx traps using barium or potassium as the NOx absorbent are susceptible to poisoning by sulfur compounds present in the exhaust gases. We have found that by using the combination of tungsten oxide with the precious metal in the loadings disclosed, and avoiding these alkaline metals, the amount of sulfur oxide reacting with the support is lowered which may provide for the material to be less prone to sulfur poisoning.

As disclosed above, according to another aspect of the invention, it comprises an exhaust gas treatment system comprising the NOx trap disclosed herein disposed in the exhaust gas passage of a gasoline internal combustion engines. The exhaust gas treatment system of this invention may include another catalyst device as, for example, a catalytic converter employing a conventional three-way catalyst containing palladium, etc., or a lean-burn catalyst such as one containing transition metals like silver, copper, etc. These catalysts, e.g., the three-way catalyst, can be placed upstream of the NOx trap, hence closer to the engine. In such an arrangement, the three-way catalyst being preferably closely mounted to the engine would warm up quickly and provide for efficient engine cold start emission control. The NOx trap would be positioned downstream of the three-way catalyst where the lower exhaust gas temperature enables maximum NOx trap efficiency. Also, with the NOx trap positioned downstream of the three-way catalyst in a remote location, it is protected against very high exhaust gas temperatures which could damage it.

As discussed above, during periods of lean-burn engine operation when NOx passes through the three-way catalyst, NOx is stored on the trap. The NOx trap is periodically regenerated by short periods or intervals of slightly rich engine operation. Thus, the stored NOx is then released (purged) from the trapping material and is catalytically reduced over the precious metal like platinum in the trap by the excess hydrocarbons and other reductants like CO and $H_2$ present in the exhaust gas. In general, the released NOx is efficiently converted to $N_2$ and $O_2$, which efficiency is enhanced when rhodium is contained within the NOx trap washcoat. However, one may wish to place a second three way catalyst downstream of the NOx trap in order to further aid in this regard. As disclosed above, the invention NOx trap is to be used for gasoline engines where during the lean-burn portion the air/fuel ratio is usually in the range 19–27.

EXAMPLE 1

A cordierite monolith, containing 35%, (by weight), alumina washcoat, is cut into two pieces. One piece is immersed into ammonium metatungstate solution to deposit 1% $WO_3$, (by weight), of this washcoat. The sample is dried at 100° C., for two hours and then calcined at 400° C. for four hours. Both of the monolith samples are brought in contact with chloroplatinic acid solution to deposit 2% Pt (by weight) of this washcoat. The samples are dried at 100° C. for three hours and calcined in air at 500° C. for five hours.

Both of the samples are evaluated for NOx conversion on a flow reactor. The feed gas composition is given below.

FEED GAS COMPOSITION:

Space Velocity=25,000 $HR^{-1}$

HC=40 ppm

CO=2400 ppm $H_2$=800 ppm

NOx=600 ppm $O_2$=1400 ppm $CO_2$=10.0%

$H_2O$=10.0%

The feed gas is maintained fuel-lean by adding $O_2$ (6%) for one minute and then is rendered rich by adding CO (1%) for an equal interval. This feed gas composition modulation is maintained during catalyst evaluation. The NOx conversion is shown in FIG. 1. As seen from this figure, the $WO_3$-modified catalyst composition provides higher NOx conversion at lower temperatures than the unmodified Pt/$Al_2O3$ catalyst. The maximum NOx conversion for Pt/$WO_3$/$Al_2O_3$ catalyst is 85% at 298° C. while it is 80% at 350° C. for Pt/$Al_2O_3$ catalyst.

EXAMPLE 2

The experiment is carried out as in Example 1, with the only difference that the $WO_3$ loading is 0.1% and Pt is 1.9% by weight. The maximum NOx conversion for Pt/$WO_3$/$Al_2O_3$ is 83% at 301° C. while it is 79% at 350° C. for Pt/$Al_2O_3$.

EXAMPLE 3

The experiment described in Example 1 is respected by employing 0.5% $WO_3$ by weight as modifier. The maximum NOx conversion is 84% at 298° C. while it is 80% at 350° C. for Pt/$Al_2O_3$ catalyst.

EXAMPLE 4

The experiment is carried out as described in Example 2, with the only difference that the Pt loading is 2.1% by weight. The maximum NOx conversion for Pt/WO/$Al_2O_3$catalyst is 85% at 297° C. while it is 80% at 346° C. for Pt/$Al_2O_3$ catalyst.

EXAMPLE 5

A silica (5%) and alumina (95%) mixed oxide is prepared by sol-gel method. By employing this composite oxide, the experiment described in Example 1 is repeated. The maximum NOx conversion for Pt/$WO_3$/$SiO_2$—$Al_2O_3$ is 84% at 294° C. while for Pt/$SiO_2$—$Al_2O_3$ it is 80% at 345° C.

EXAMPLE 6

Titania (3%) and alumina (97%) composite oxide is prepared by sol-gel method. By employing this composite oxide, the experiment described in Example 1 is repeated. The maximum NOx conversion for Pt/WO/$TiO_2$—$Al_2O_3$ catalyst is 84% at 298° C. while it is 80% at 352° C. for Pt/$TiO_2$-$Al_2O_3$ catalyst.

EXAMPLE 7

Zirconia (2% by weight) is deposited on gamma-alumina. This composite oxide is employed to carry on the experiment described in Example 1. The maximum NOx conversion for Pt/$WO_3$/$ZrO_2$/$Al_2O_3$ catalyst is 85% at 300° C. while it is 80% at 352° C. for Pt/$ZrO_2$/$Al_2O_3$ catalyst.

EXAMPLE 8

Lanthana (1.5% by weight) is deposited on alumina and the experiment is carried out as in Example 1 by employing this composite oxide. The maximum NOx conversion for Pt/$WO_3$/$La_2O_3$/$Al_2O_3$ catalyst is 84% at 300° C. while it is 80% at 350° C. for Pt/$La_2O_3$/$Al_2O_3$ catalyst.

EXAMPLE 9

Barium oxide (1% by weight) is deposited on alumina, and by employing this composite oxide, the experiment is carried out as described in Example 1. The maximum NOx conversion for Pt/$WO_3$/BaO/$Al_2O_3$ catalyst is 84% at 305° C. while it is 81% at 345° C. for Pt/BaO/$Al_2O_3$ catalyst.

EXAMPLE 10

The experiment described in Example 1 is carried out by maintaining the feed gas lean for 70 seconds and then rich for 70 seconds. This feed gas composition modulation is maintained during catalyst evaluation. The maximum NOx conversion for Pt/$WO_3$/$Al_2O_3$ catalyst is 84% of 300° C. while it is 78% at 350° C. for Pt/$Al_2O_3$ catalyst.

EXAMPLE 11

The experiment is carried out as described in Example 1, with the only difference that the feed gas is mained rich only for 45 seconds instead of 60 seconds. The maximum NOx conversion for Pt/$WO_3$/$Al_2O_3$ catalyst is 81% at 300° C. while it is 75% at 350° C. for Pt/$Al_2O_3$ catalyst.

We claim:

1. A method for treating exhaust gases from an internal combustion engine using a nitrogen oxide trap, said method comprising the steps of:
   locating in the exhaust gas passage of said internal combustion engine a nitrogen oxide trap material comprising:
   (a) porous support material comprising mostly γ-alumina;
   (b) metals consisting essentially of 0.1 to 2 wt. % tungsten oxide and precious metal comprising 0.5 to 4 wt. % platinum deposited on said support, the amount of said metals being individually based on the weight of said support material;
   exposing said nitrogen oxide trap to engine exhaust gases having a lean of stoichiometric air/fuel ratio whereby said trap absorbs nitrogen oxides from said exhaust gas;
   monitoring the amount of absorbed nitrogen oxides in said trap; and
   purging said absorbed nitrogen oxides from said trap by subjecting said nitrogen oxide trap to engine exhaust gases whose air/fuel ratio is stoichiometric or rich of stoichiometry.

2. The method according to claim 1 wherein said tungsten oxide comprises about 0.1–0.5 wt. % and the platinum comprises about 1.5–2.5 wt. %.

3. The method according to claim 1 wherein said support is γ-alumina.

4. The method according to claim 1 wherein said support further comprises materials selected from the group consisting of cerium oxide, barium oxide, zirconium oxide, lanthanum oxide, titanium oxide, and alpha-alumina.

5. The method according to claim 1 which further comprises locating a three-way catalyst or a lean-nitrogen oxide catalyst upstream of said nitrogen oxide trap.

6. The method according to claim 1 which further comprises locating a three-way catalyst downstream of said nitrogen oxide trap.

7. The method according to claim 1 wherein the alumina support loaded with platinum/tungsten oxide is carried on a substrate.

8. The method according to claim 7 wherein said substrate is selected from corderite, metal, or ceramic honeycomb materials.

9. The method according to claim 7 wherein said substrate carries about 25–35 weight percent alumina support loaded with platinum/tungsten oxide.

10. The method according to claim 1 wherein said locating step comprises first forming said nitrogen oxide trap material by impregnating said porous support material with a solution of said metals, either individually or together, and subsequently drying the material to remove said solvent.

11. The method according to claim 10 wherein said tungsten compound solution is impregnated first into said support followed by said platinum compound solution.

12. The method according to claim 1 wherein rhodium, palladium, or their mixture is also deposited on said porous support material with said platinum.

* * * * *